United States Patent Office 3,384,598
Patented May 21, 1968

3,384,598
HALOPHOSPHATE PHOSPHOR TREATMENT
PROCESS
Arnold I. Friedman, South Euclid, and David H. Beaumont, Lyndhurst, Ohio, assignors to General Electric Company, a corporation of New York
No Drawing. Filed Mar. 19, 1965, Ser. No. 441,317
4 Claims. (Cl. 252—301.4)

ABSTRACT OF THE DISCLOSURE

Sulfamic acid can be used effectively to wash deleterious impurities from newly produced alkaline earth halophosphate phosphors to improve the brightness and maintenance of light output of the phosphors. At least about 10.5 grams of sulfamic acid for each kilogram of phosphor are needed, and preferred proportions and concentrations of sulfamic acid are stated.

This invention relates to the treatment of luminescent material to improve brightness and maintenance of brightness. More specifically, the invention relates to the washing or leaching of halophosphate phosphors normally used in electric discharge lamps, particularly in fluorescent lamps.

A conventional commercial process for the removal of impurities and unwanted materials from halophosphate phosphors involves washing or leaching with ammoniated ethylenediamine tetracetic acid which acts as a sequestering agent removing impurity metal ions as metal chelates. This process is described and claimed in Patent 3,047,-512, Martyny, assigned to the assignee of the present application, and is hereby incorporated by reference into the present application. The complete details of the process and the problem will not be repeated herein.

As is well known in the art, halophosphate phosphors are more or less analogous to the natural mineral apatite represented by the formula $3M_3(PO_4)_2 1M'L_2$, wherein L represents a halogen or mixture of halogens, and M and M' represent either different or identical alkaline earth metals or mixtures of such metals. As explained in the above-mentioned Martyny patent, reducible compounds of antimony or manganese, an also calcium in other than the apatite structure, are sometimes present in manufactured phosphors and can have deleterious effects on the performance of lamps using such phosphors. Several methods have been utilized in the prior art to remove such impurities from the phosphor crystals before utilization of the phosphors in lamp production.

Although ammoniated ethylenediamine tetracetic acid washing allows the production of phosphors suitable for use in lamps, improvements in phosphor brightness and maintenance of brightness are constantly being sought. In addition, economies in production through the use of less expensive materials are also desirable.

Accordingly, it is an object of the present invention to provide a process for removing deleterious impurities from phosphors by leaching or washing such that the resulting phosphor will be capable of attaining higher brightness in lamp applications.

Another object of the invention is to provide a means for producing such phosphors having longer maintenance of light output and lower depreciation than previously known methods.

Briefly stated, the present invention in one form satisfies the above objects by providing a process for the washing of phosphors in an aqueous solution of sulfamic acid containing at least about 10.5 grams of sulfamic acid per kilogram of phosphor but no more than the amount of sulfamic acid that can be essentially removed from the phosphor during subsequent processing. The washing process comprises agitating the phosphor in the solution, and separating the phosphor from the liquid. The phosphor is then rinsed to remove residual acid. Depending on other process parameters including the length of time for washing, amount of rinsing, temperature, and other factors, the upper limit on the amount of sulfamic acid that can be beneficially utilized is preferably no more than 84 grams per kilogram of phosphor. Also depending upon other process parameters, the sulfamic acid concentration expressed as percent by weight of the water is from about 0.25% to about 3%. Preferably, the process utilizes from about 21 to about 42 grams of sulfamic acid per kilogram of phosphor at an acid concentration of about 1.5%. We have found in certain applications that the optimum amount of sulfamic acid in relation to the amount of phosphor is about 42 grams per kilogram.

Although the optimum parameters governing the use of sulfamic acid as a washing or leaching material depend on many factors, the three factors which can be most readily controlled and contribute most to the results are the following:

(1) The ratio of the amount of sulfamic acid to amount of phosphor (expressed herein on a weight basis).

(2) The degree to which the sulfamic acid is diluted with water (expressed herein as sulfamic acid weight percentage of the water used).

(3) The lengths of time alloted for the washing step. This factor can be influenced by temperature.

In the tests conducted in relation to the present invention, the time of the washing was about 45 minutes, and the operation was performed at approximately room temperature (about 72° F.) subject only to minor variations due to endothermic or exothermic reactions that might occur during the process.

In our process, the phosphor is produced in the normal manner known in the art such as generally explained in the above-mentioned Martyny patent and other patents mentioned therein. After the phosphor has been completely formed and produced to approximately the desired particle sizes, it is treated by washing according to the present invention by agitating the phosphor in an aqueous solution of sulfamic acid, preferably in amount of about 21–42 grams per kilogram of the phosphor with 1.5% acid concentration in the water. Sulfamic acid in its pure condition at room temperature is a solid having the formula $NH_2SO_3H$. The process is performed by suspending the phosphor in water with agitation, and then adding solid sulfamic acid in calculated amounts. After washing, the phosphor is separated from the liquid by hydrocycloning or other methods known in the art, and the phosphor is then rinsed, such as by dilution with deionized water to remove residual sulfamic acid.

By means of a designed series of tests, it was determined that the above-stated limits on ratio of acid to phosphor and concentration of the acid in water are critical in the use of the invention.

Table I below presents data comparing the light output of lamps made using phosphors produced according to the invention with that of lamps made using the phosphors produced by the process of the Martyny patent. The light measurements are in lumens. The phosphors in the test lamps were washed by the optimum method of the invention; that is, using about 42 grams of sulfamic acid per kilogram of phosphor in a 1.5% acid concentration in water.

TABLE I.—BRIGHTNESS COMPARISON

| Hours | 0 | 100 | 500 |
|---|---|---|---|
| Control | 3,309 | 3,200 | 3,126 |
| Test | 3,281 | 3,198 | 3,149 |

It can be seen from the table that lamps made with phosphors of the invention maintain their brightness better than do the control lamps, having a smaller rate of light depreciation during the first 500 hours of lamp operation. The lamps used in these tests are normal 40 watt cool white fluorescent lamps. Moreover, phosphors produced according ot the invention exhibit in such lamps a significant increase in initial brightness over unwashed phosphors, such as on the order of 75 to 100 lumens per lamp.

Further testing determined that significant decreases in phosphor performance were beginning to occur at about 10.5 grams or less of sulfamic acid per kilogram of phosphor in the washing. Also, with the rinsing procedure used, no more than 84 grams of sulfamic acid per kilogram of phosphor should be used to still avoid substantial harm to the phosphor. Since the sulfamic acid is considerably less expensive than the previously used ammoniated ethylenediamine tetracetic acid, the invention could be beneficially used with other than optimum concentrations and ratios within the limits claimed in this application. Likewise, the useful outside limits of acid concentration in water for the invention have been determined to be 0.25% and 3% by weight.

While specific examples have been given of processing of phosphors, it will be understood that various changes, omissions and substitutions may be made within the true spirit and scope of the invention as defined in the appended claims.

What we claim as new and desire to secure by Letters Patent of the United States is:

1. A process for improving the brightness and maintenance of alkaline earth halophosphate phosphors which comprises agitating the phosphor in an aqueous solution of sulfamic acid containing at least about 10.5 grams of sulfamic acid for each kilogram of phosphor and containing no more sulfamic acid than can be essentially removed from the phosphor in subsequent processing, separating the phosphor from the liquid, and rinsing the phosphor to remove residual sulfamic acid.

2. A process for improving the brightness and maintenance of alkaline earth halophosphate phosphors which comprises agitating the phosphor in an aqueous solution of sulfamic acid containing from about 10.5 grams to about 84 grams of sulfamic acid per kilogram of phosphor with the acid concentration expressed as weight percentage of the water being from about 0.25% to about 3.0%, separating the phosphor from the liquid, and rinsing the phosphor to remove residual sulfamic acid.

3. The method of treating alkaline earth halophosphate phosphors to improve their brightness and maintenance which comprises agitating the phosphors in an aqueous solution containing from about 21 grams to about 42 grams of sulfamic acid per kilogram of phosphor with the acid concentration expressed as weight percentage of the water at about 1.5%, separating the phosphor from the liquid, and rinsing the phosphor to remove residual sulfamic acid.

4. The method of treating alkaline earth halophosphate phosphors to improve their brightness and maintenance which comprises agitating the phosphor in an aqueous solution containing about 42 grams of sulfamic acid per kilogram of phosphor with the acid concentration expressed as weight percentage of the water at about 1.5%, separating the phosphor from the liquid, and rinsing the phosphor to remove residual sulfamic acid.

References Cited

UNITED STATES PATENTS 3,060,129   10/1962   Hoekstra _____ 252—301.4

OTHER REFERENCES

The Condensed Chemical Dictionary, edited by Rose 1961, pp. 1087–88, "Sulfamic Acid."

TOBIAS E. LEVOW, *Primary Examiner.*

ROBERTS D. EDMONDS, *Examiner.*